(12) United States Patent
Thota et al.

(10) Patent No.: US 12,207,588 B2
(45) Date of Patent: Jan. 28, 2025

(54) SEED POD DEPLOYER

(71) Applicant: Flash Forest Inc., Shelburne (CA)

(72) Inventors: Badriveer Thota, Etobicoke (CA); Yutong Xie, Toronto (CA); Navneet Ambale Gopinath, Toronto (CA); Jeffery Awobodu, Oakville (CA)

(73) Assignee: Flash Forest Inc., Shelburne (CA)

( * ) Notice: Subject to any disclaimer, the term of this patent is extended or adjusted under 35 U.S.C. 154(b) by 0 days.

(21) Appl. No.: 18/482,130

(22) Filed: Oct. 6, 2023

(65) Prior Publication Data

US 2024/0114821 A1    Apr. 11, 2024

Related U.S. Application Data

(60) Provisional application No. 63/414,235, filed on Oct. 7, 2022.

(51) Int. Cl.
*A01C 7/18* (2006.01)
*A01C 7/20* (2006.01)
*A01C 17/00* (2006.01)

(52) U.S. Cl.
CPC .............. *A01C 7/18* (2013.01); *A01C 7/201* (2013.01); *A01C 17/005* (2013.01)

(58) Field of Classification Search
CPC ......... A01C 7/18; A01C 7/201; A01C 17/005; A01C 7/00; A01C 7/20; A01C 17/00
See application file for complete search history.

(56) References Cited

U.S. PATENT DOCUMENTS

| 5,464,208 A | 11/1995 | Pierce |
| 10,212,876 B2 | 2/2019 | Aghai et al. |
| 2019/0116719 A1 | 4/2019 | Fletcher et al. |
| 2020/0137943 A1 | 5/2020 | Aghai et al. |
| 2020/0364456 A1 | 11/2020 | Tran et al. |
| 2021/0053681 A1 | 2/2021 | Zvara |
| 2021/0251130 A1 | 8/2021 | Radtke et al. |
| 2022/0007567 A1 | 1/2022 | Reabow et al. |
| 2022/0057695 A1 | 2/2022 | Pan et al. |

FOREIGN PATENT DOCUMENTS

| CN | 113460304 A | 10/2021 | |
| CN | 216269923 U | 4/2022 | |
| DE | 102014007995 A1 | 12/2015 | |
| KR | 200271137 Y1 * | 4/2002 | ............. A63B 69/40 |
| WO | 2019213793 A1 | 11/2019 | |
| WO | 2022141667 A1 | 7/2022 | |

OTHER PUBLICATIONS

International Search Report & Written Opinion in PCT/CA2023/051328 dated Dec. 12, 2023.
Daly, James, Replanting A Forest, One Drone At A Time, Wired Magazine, obtained from the internet at https://www.wired.com/brandlab/2015/07/re-planting-forest-one-drone-time/ on Apr. 14, 2022.

\* cited by examiner

*Primary Examiner* — Christopher J. Novosad
(74) *Attorney, Agent, or Firm* — Manelli Selter, PLLC; Edward Stemberger

(57) ABSTRACT

A seed pod deployer includes a body having a hopper adapted to contain a plurality of seed pods; a feeder adapted to transfer the seed pods from the hopper to a nozzle; a launcher adapted to receive the seed pods from the nozzle, the launcher comprising a pair of flywheels and at least one motor adapted for driving the pair of flywheels; and a control system adapted for controlling the operation of the seed pod deployer.

20 Claims, 14 Drawing Sheets

SEED POD DEPLOYER

FIELD

This specification relates to seed pod distribution systems and, in particular, to seed pod deployers and components thereof together with their systems and methods of use with aerial or ground based distribution systems.

BACKGROUND

The following background discussion is not an admission that anything discussed below is citable as prior art or common general knowledge. The documents listed below are incorporated herein in their entirety by this reference to them.

Seed pods containing desired materials for propagating new organisms are known. Such seed pods may contain seeds, seedlings or other propagules in combination with materials to promote the growth of the propagules. Such seed pods are preferably adapted for use with seed pod deployers mounted to aerial or ground-based distribution systems such as aerial drones used for reforestation projects.

Current seed pod deployers utilize mechanical systems that are adapted to either drop seed pods at desired intervals so that they may fall to the ground under the influence of gravity or propel seed pods at desired intervals using a propulsion system so that they may be directed to the ground with a force greater than gravity.

For certain applications, such as the distribution of seed pods for reforestation projects, it is desirable that the seed pods be propelled at sufficient velocity that the seed pods be partially or fully embedded in the ground.

A problem with current seed pod deployers, and in particular seed pod deployers used with aerial based distribution systems, is that their seed pod propulsion systems are often unable to propel seed pods at a sufficient velocity to partially or fully embed the seed pods in the ground. Current seed pod deployers are often not able to propel seed pods in excess of terminal velocity (due to gravity and air resistance) and thus seed pods are vulnerable to wind conditions and, when flown at high altitudes, current deployers are unable to target planting sites with precision.

Another problem with current seed pod deployers is that their seed pod propulsion systems often have components that are bulky or heavy and thus limit the amount of seed pods that may be carried by the aerial or ground-based distribution systems. This is particularly problematic for aerial based distribution systems such as drones that have limitations in terms of battery power and weight carrying capabilities.

Another problem with current seed pod deployers is that they are not able to operate continuously to propel pods at a desired rate but instead need to wait for a set period of time before the deployer is able to deploy the next pod.

Another problem with current seed pod deployers is that the seed pods may become jammed or clogged in the seed pod propulsion systems.

Another problem with current seed pod deployers is that their control systems are dependent upon the controls utilized for different types of aerial or ground-based distribution systems.

There is a need for an improved seed pod deployer that improves upon one or more problems associated with prior known designs.

SUMMARY

In one aspect, the invention provides a seed pod deployer comprising:
(i) a hopper adapted to contain a plurality of seed pods;
(ii) a feeder adapted to transfer the seed pods from said hopper to a nozzle; and
(iii) a launcher adapted to receive the seed pods from said nozzle and launch the seed pods toward a ground surface, said launcher comprising a pair of flywheels and at least one motor adapted for driving said pair of flywheels, wherein said pair of flywheels is spaced by a gap adapted to receive and launch a seed pod.

In another aspect, the invention provides a seed pod deployer comprising:
(i) a hopper adapted to contain a plurality of seed pods;
(ii) a feeder adapted to transfer the seed pods from said hopper to a nozzle, wherein said feeder includes a carousel having a plurality of slots each of which are adapted to receive one of the seed pods; and
(iii) a launcher adapted to receive the seed pods from said nozzle and launch the seed pods toward a ground surface.

In another aspect, the invention provides distribution system for seed pods comprising:
a seed pod deployer having
a hopper adapted to contain a plurality of seed pods;
a feeder adapted to transfer the seed pods from said hopper to a nozzle; and
a launcher adapted to receive the seed pods from said nozzle and launch the seed pods toward a ground surface, said launcher comprising a pair of flywheels and at least one motor adapted for driving said pair of flywheels, wherein said pair of flywheels is spaced by a gap adapted to receive and launch a seed pod; and
a mount disposed on said seed pod deployer for mounting said seed pod deployer to the distribution system.

Other aspects and features of the teachings disclosed herein will become apparent to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. For simplicity and clarity of illustration, where considered appropriate, reference numerals may be repeated among the drawings to indicate corresponding or analogous elements.

DESCRIPTION OF VARIOUS EMBODIMENTS

Various apparatuses or methods will be described below to provide examples of the claimed invention. The claimed invention is not limited to apparatuses or methods having all of the features of any one apparatus or method described below or to features common to multiple or all of the apparatuses described below. The claimed invention may reside in a combination or sub-combination of the apparatus elements or method steps described below. It is possible that an apparatus or method described below is not an example of the claimed invention. The applicant(s), inventor(s) and/or owner(s) reserve all rights in any invention disclosed in an apparatus or method described below that is not claimed in this document and do not abandon, disclaim or dedicate to the public any such invention by its disclosure in this document.

Directional or positional terms used herein, such as up, down, upper, lower, top and bottom are referencing directions or positions relative to a ground surface.

Figure 1:
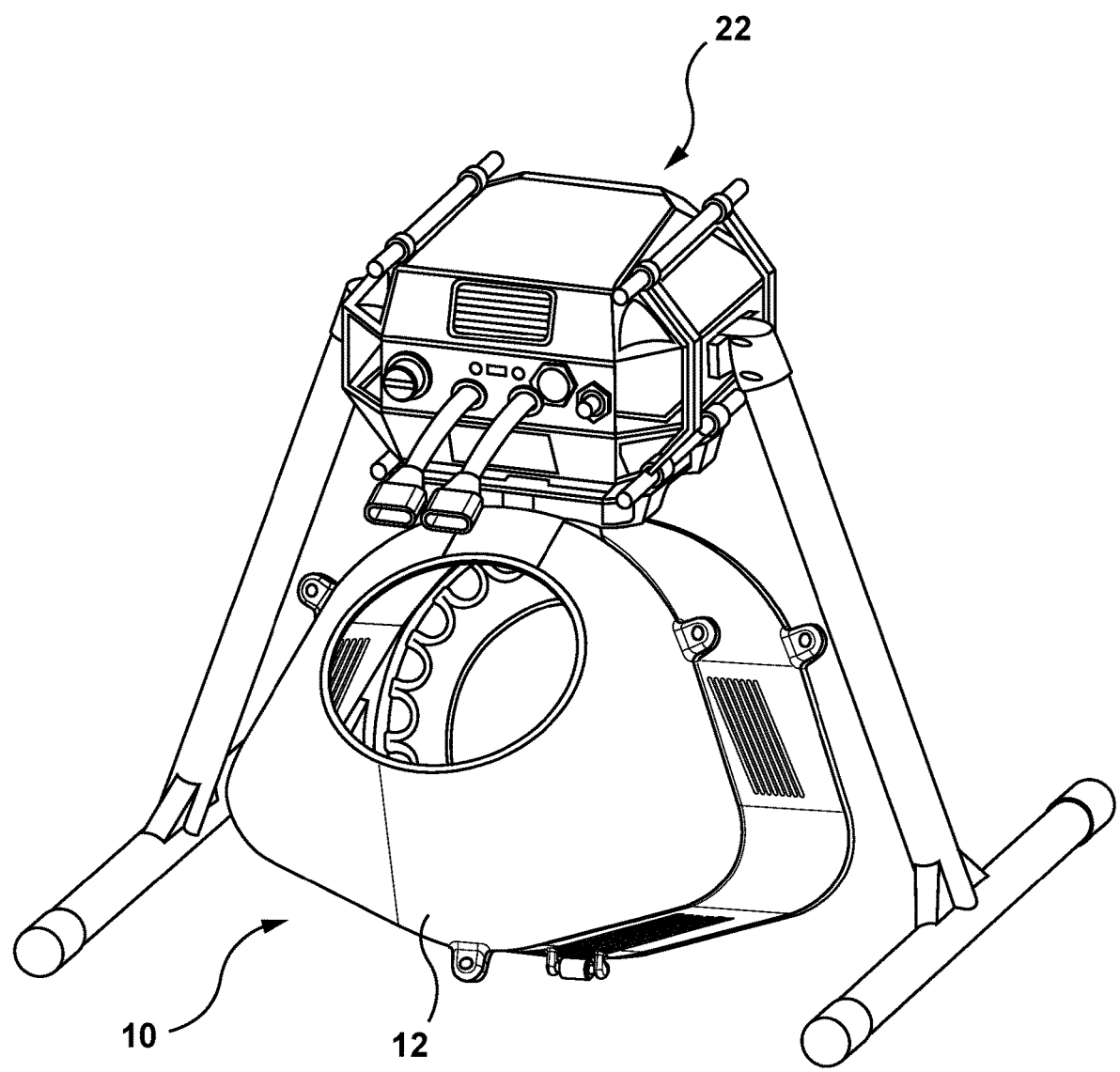
FIG. 1 is a front perspective view of a seed pod deployer mounted to a distribution system in accordance with an embodiment of the present disclosure.
Figure 2:
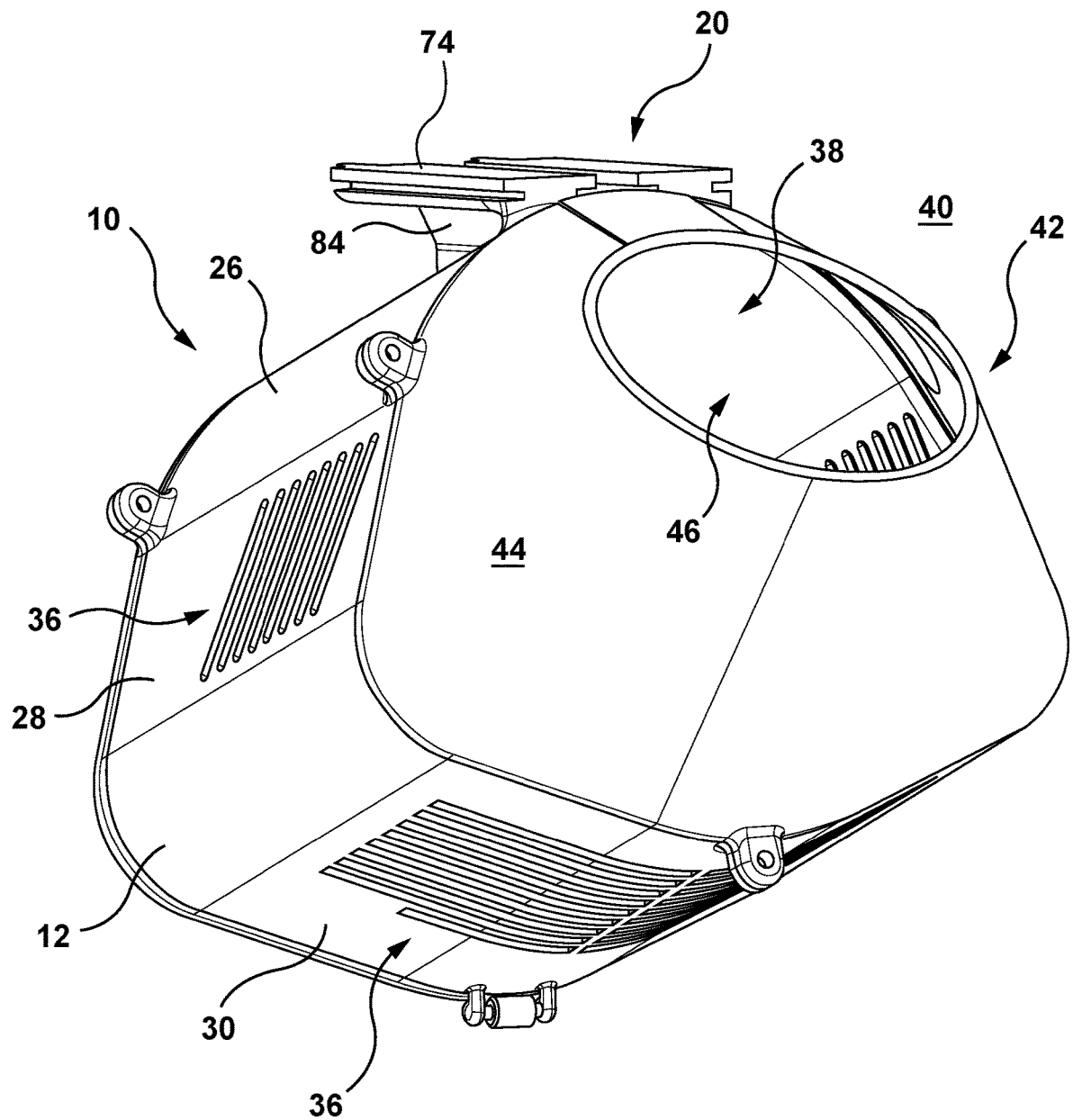
FIG. 2 is a front perspective view of the seed pod deployer of FIG. 1.
Figure 3:
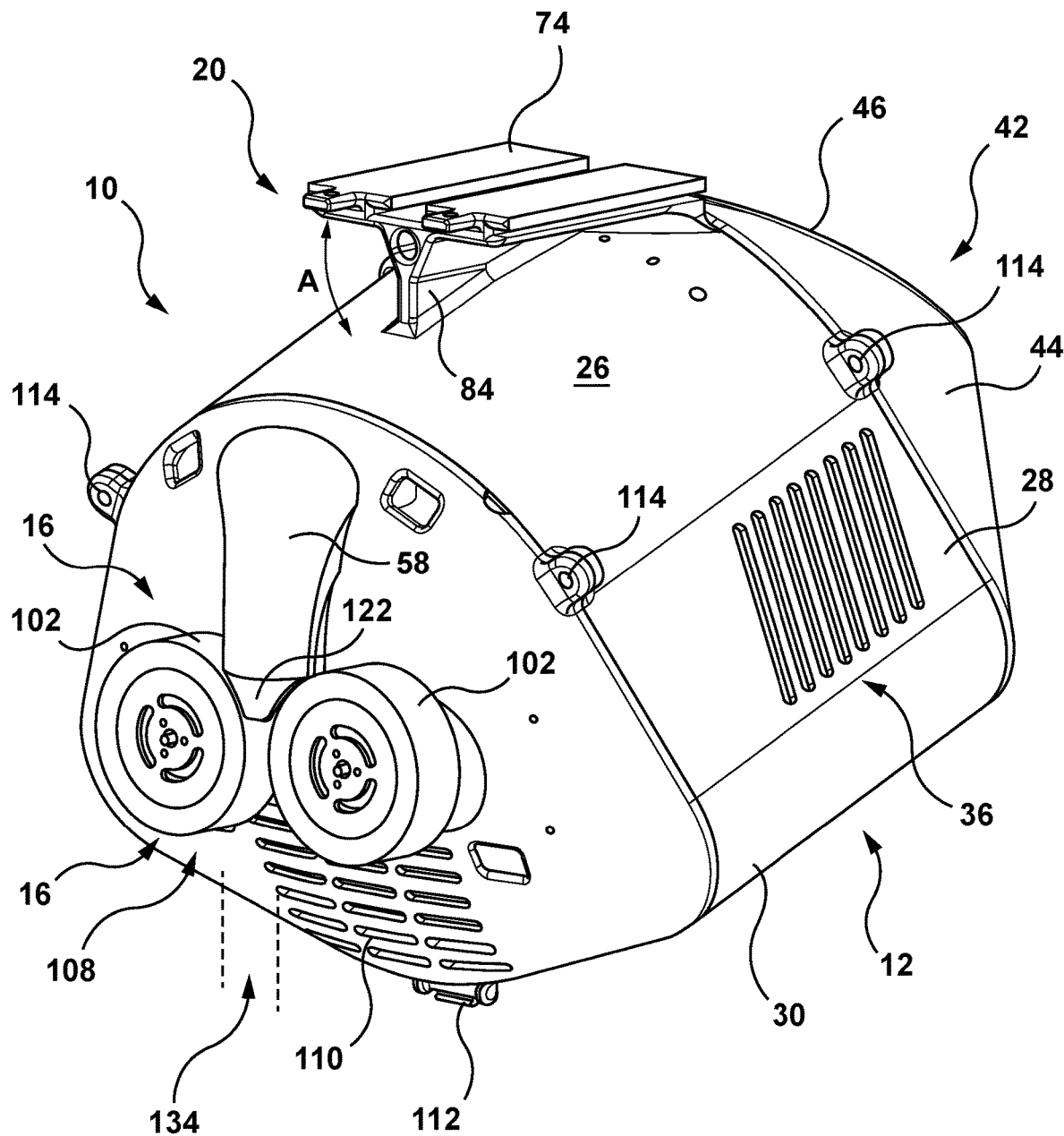
FIG. 3 is a rear perspective view of the seed pod deployer of FIG. 1.
Figure 4:
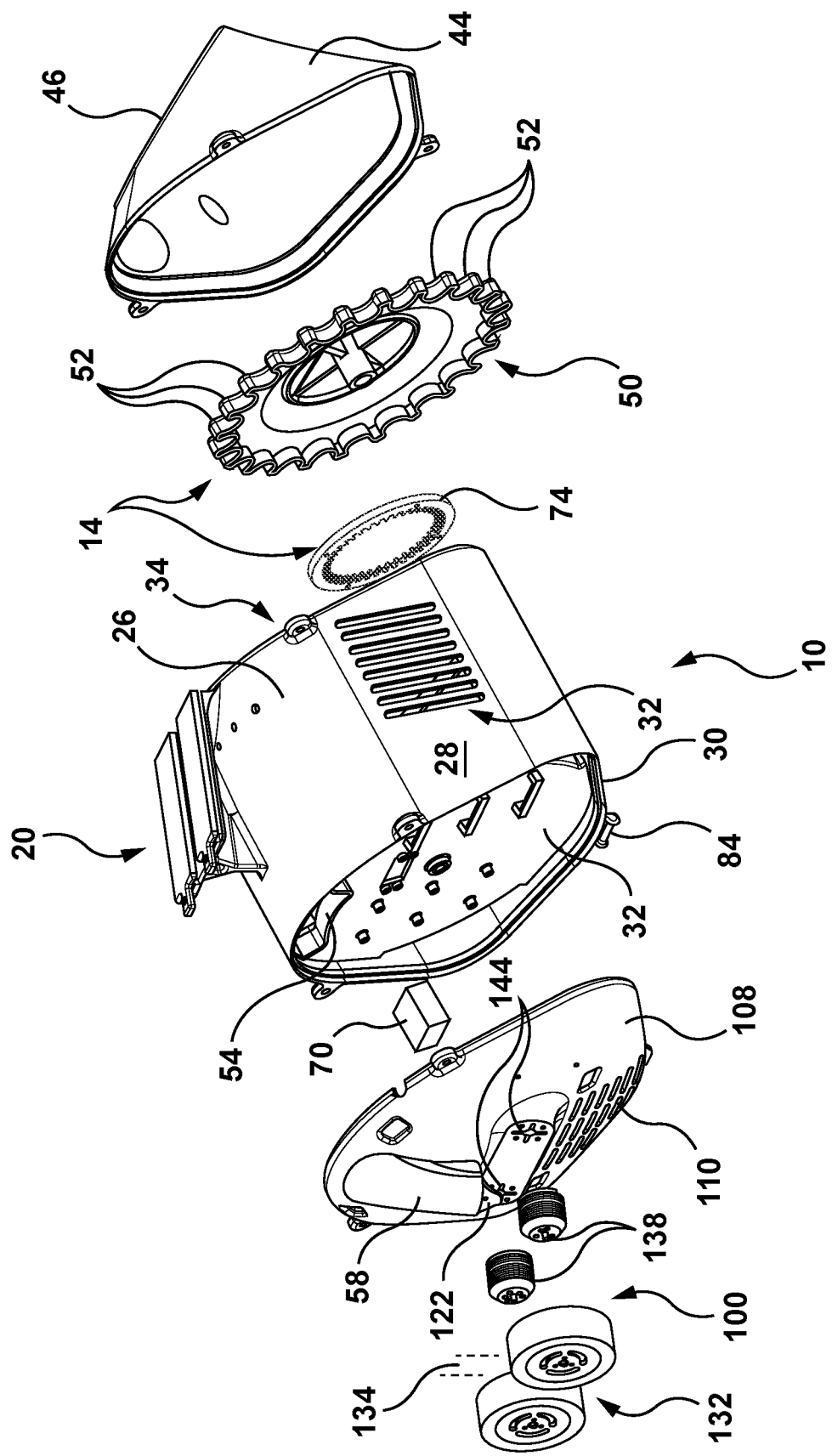
FIG. 4 is an exploded rear perspective view of the seed pod deployer of FIG. 1.
Figure 5:
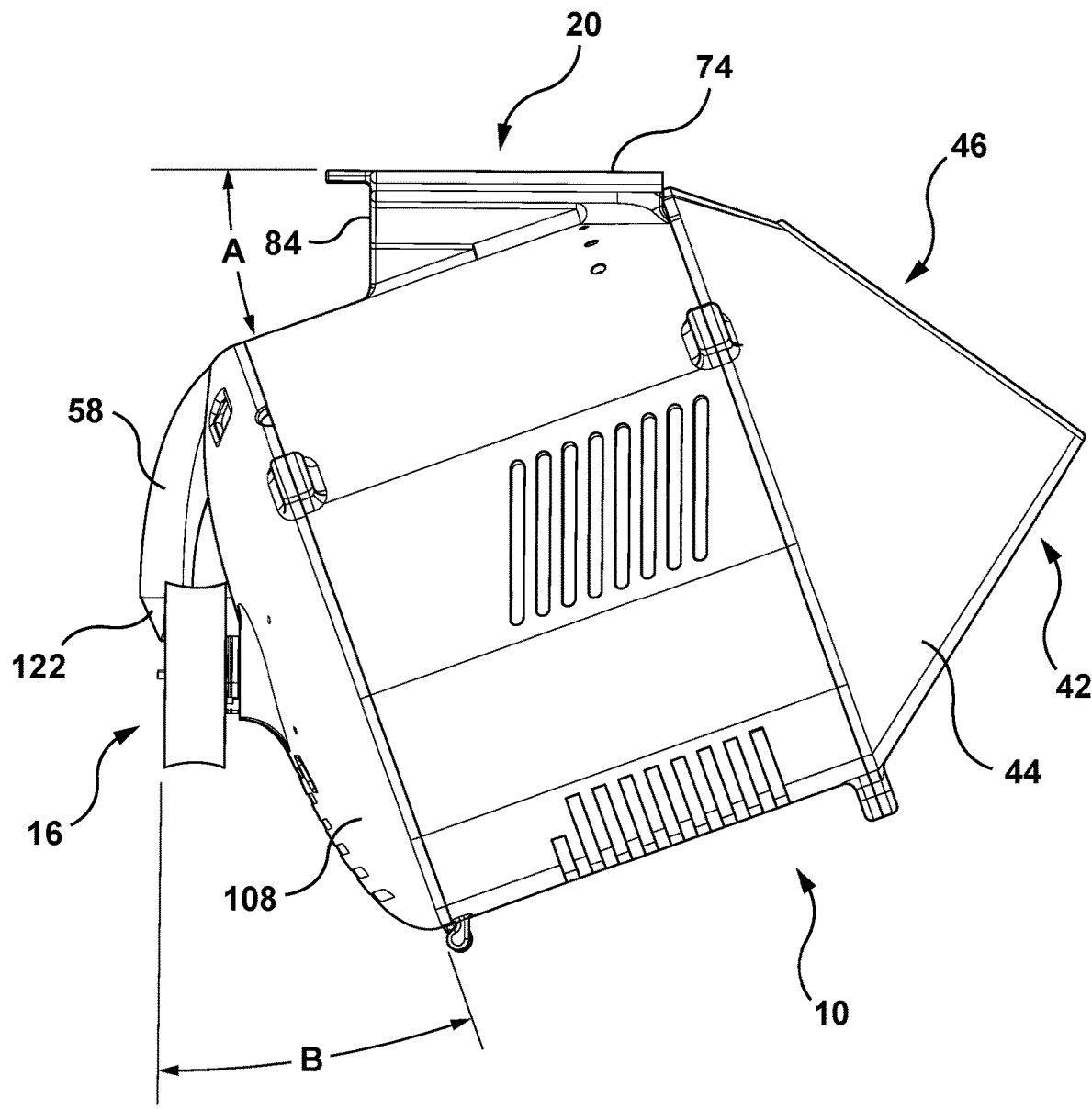
FIG. 5 is a side view of the seed pod deployer of FIG. 1.
Figure 7:
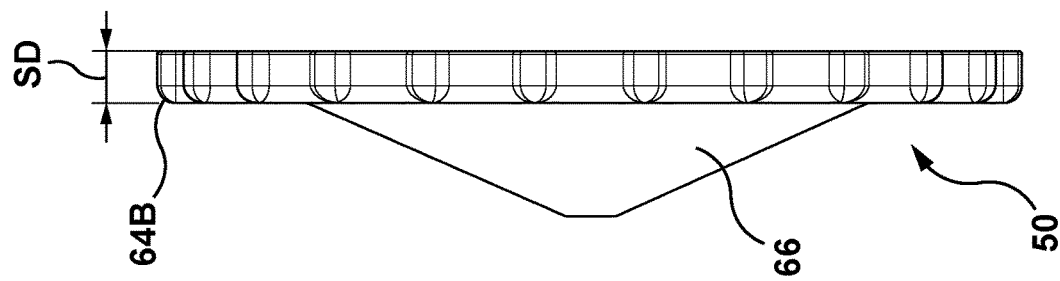
FIG. 7 is a side view of the carousel shown in FIG. 6.
Figure 6:
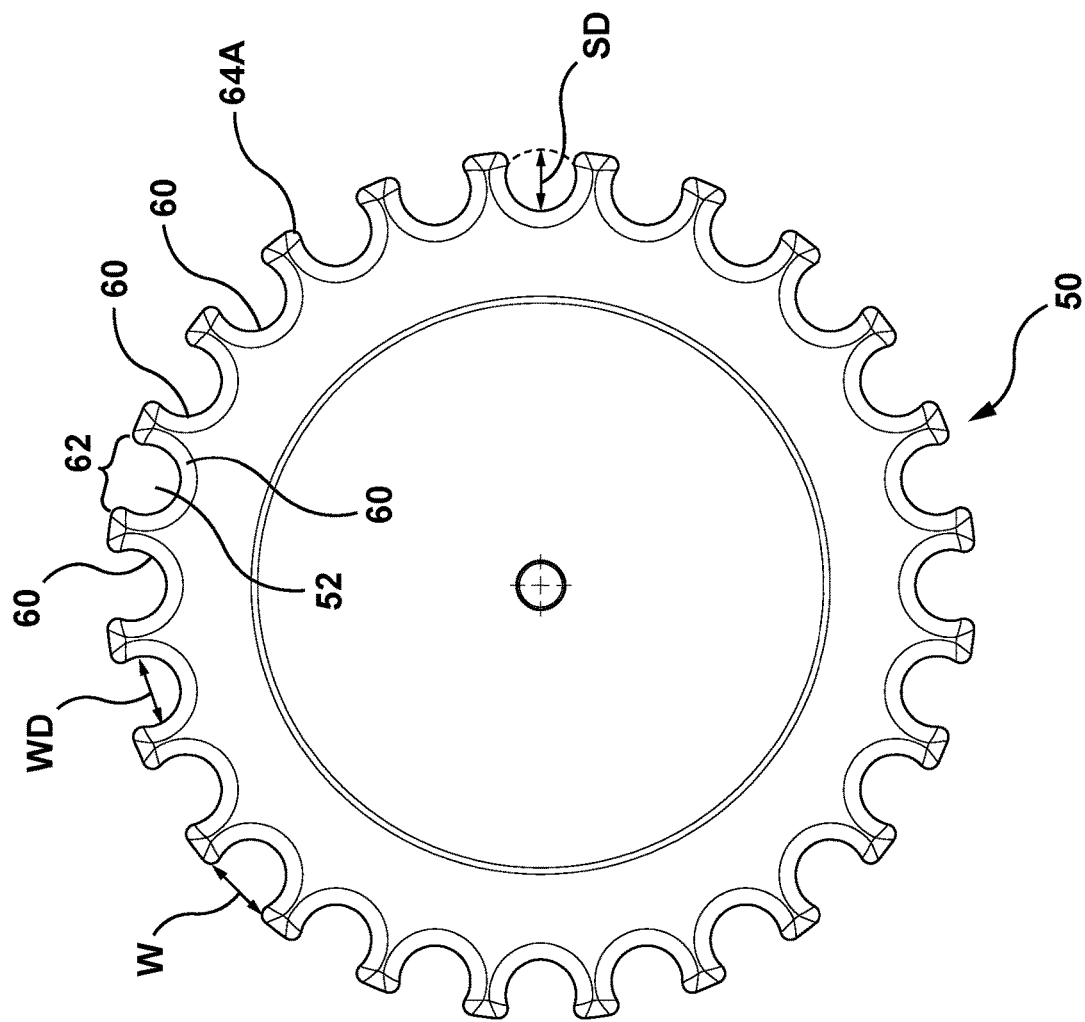
FIG. 6 is an end view of the carousel for the seed pod deployer of FIG. 1.
Figure 8:
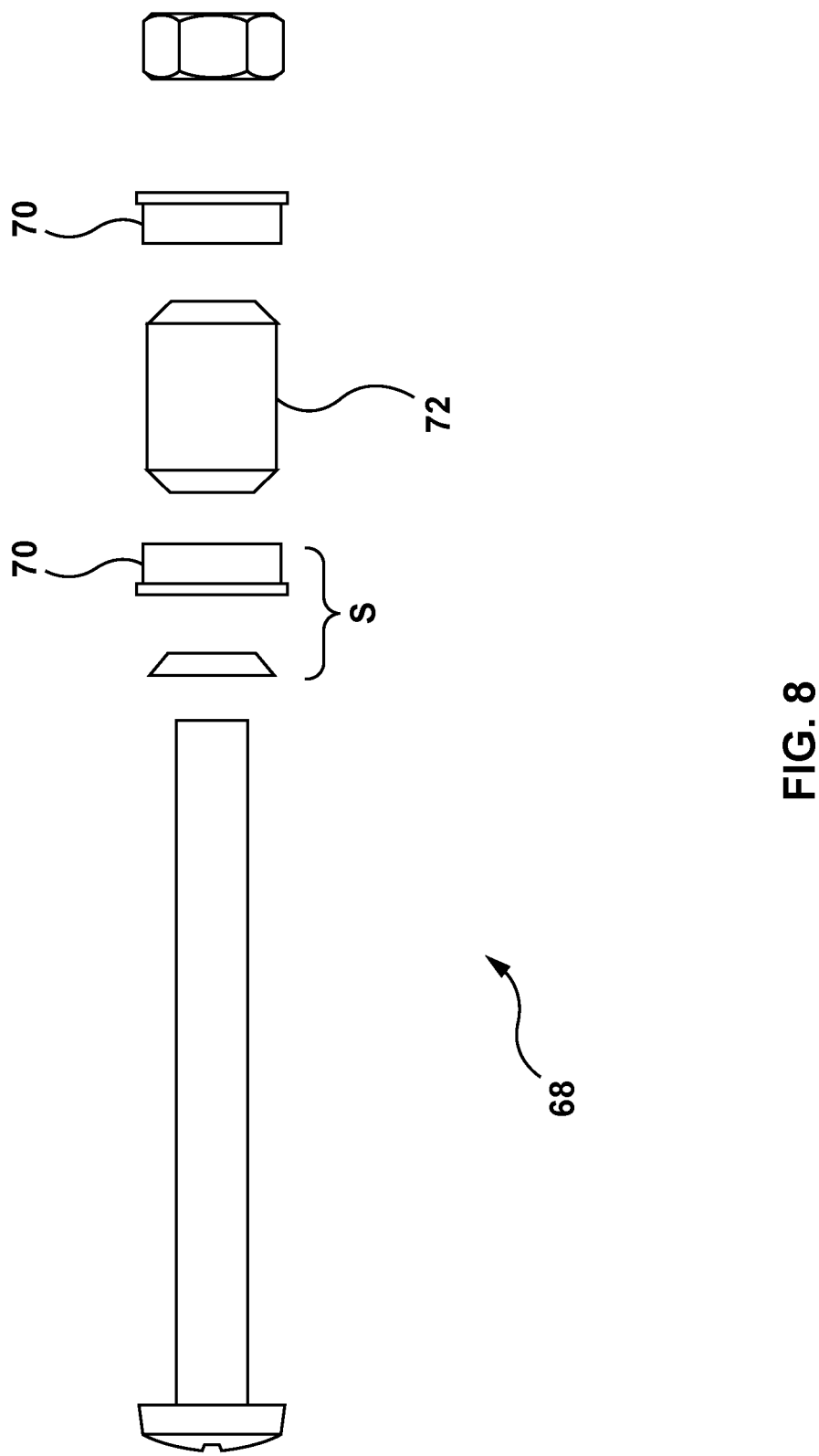
FIG. 8 is an exploded view of the screw assembly for securing the carousel to the seed pod deployer of FIG. 1.
Figure 9:
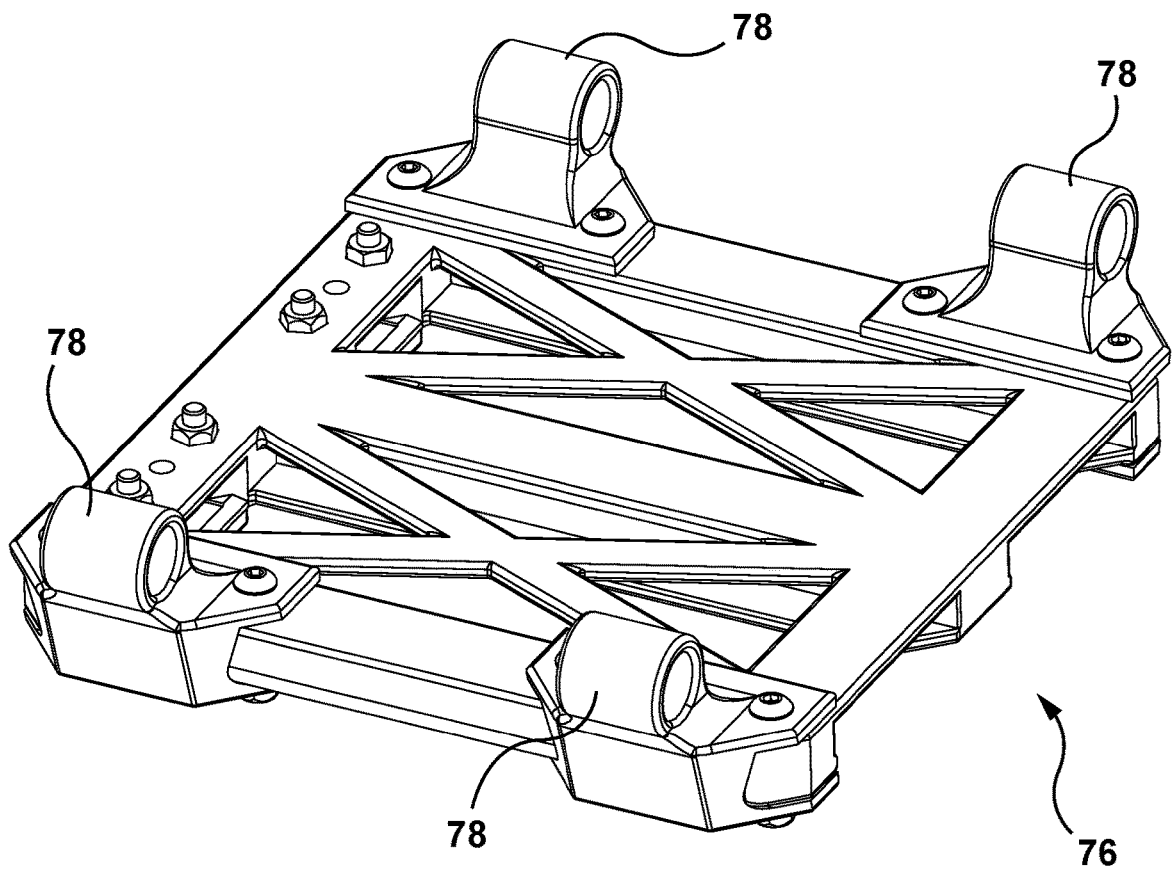
FIG. 9 is a perspective view of a payload plate for mounting the seed pod deployer of FIG. 1 to a distribution system.
Figure 10:
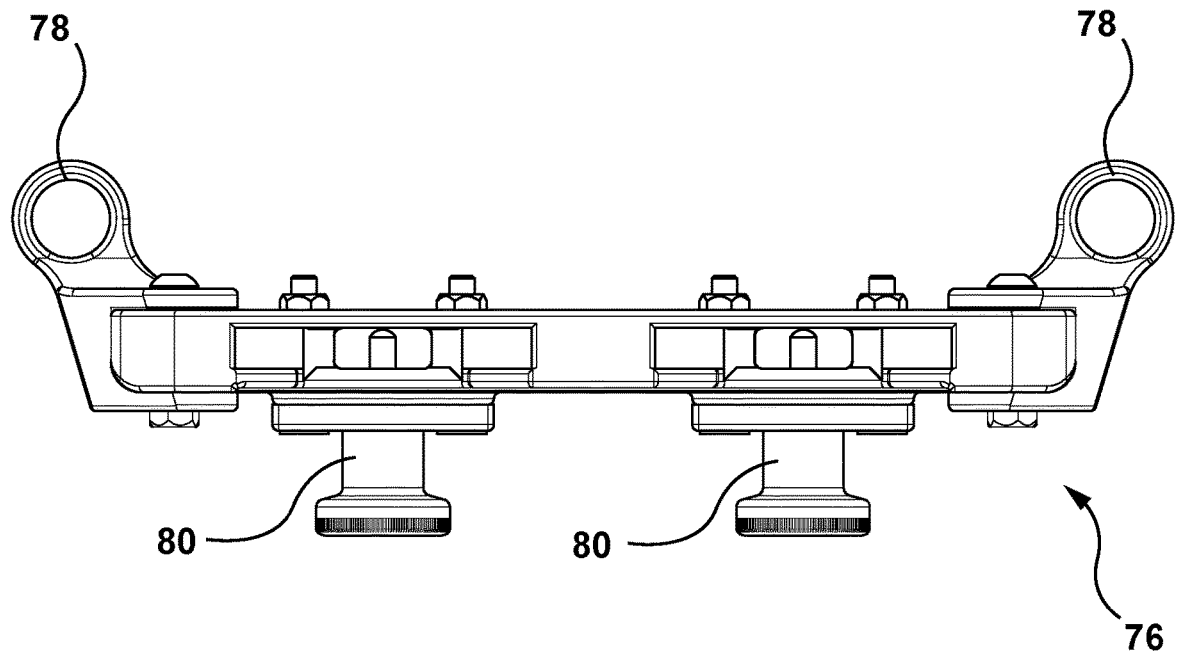
FIG. 10 is an end view of the payload plate shown in FIG. 9.

A seed pod deployer in accordance with an embodiment of the present disclosure is shown generally at 10 in the figures. Deployer 10 includes a body 12, a feeder 14, a launcher 16, a control system 18 and a mount 20. Deployer 10 is adapted to be attached using mount 20 to a distribution system 22 such as a ground based or aerial based drone for distributing one or more seed pods 24 (as shown in FIG. 1).

Body 12 includes a top wall 26, a side wall 28, a bottom wall 30 and a back wall 32 defining a hopper 34 that is adapted to hold a plurality of seed pods 20. Vents 36 are defined in body 12 to allow air flow between the interior 38 and exterior 40 of body 12. Hopper further includes a chute 42 with tapered walls 44 defining an upward facing opening 46 adapted for loading seed pods 24 into hopper.

Feeder 14 includes a carousel 50 contained in the hopper. Carousel includes a plurality of slots 52 each adapted to receive and hold a seed pod 24. Carousel is positioned within hopper proximate to back wall such that seed pods 24 fall within slots under the influence of gravity.

Referring to FIGS. 6 and 7, carousel is adapted to be rotated within hopper to transfer seed pods contained in slots to a duct 54 having an aperture 56 defined in back wall of body 12 that leads to a nozzle 58 disposed above launcher 16.

Carousel 50 includes walls 60 with an opening 62 that define slots 52. Walls 60 are preferably cylindrical in shape with a wall diameter WD that is larger than the diameter D of seed pods 24 in order that seed pods may easily fall within each slot. Preferably wall diameter WD is less than 2D, more preferably in the range of 1.2-1.5 D, even more preferably between 1.35-1.45 D and most preferably around 1.4 D. If the wall diameter WD is too small, for the same speed of rotation, some of the slots would fail to pick up a pod. To achieve optimum slot occupancy, the rotational speed would have to be reduced, hence slowing the overall pod embedding rate. If the wall diameter WD is too large it may result in jams due to multiple pods, half pods or broken pods becoming wedged within the slot. Opening 62 preferably has a width W in the range of 0.8 D-1.4 D (where D is the diameter of seed pod) and more preferably around 1 D. This width of opening 62 allows pods to roll into the slot at the bottom of the hopper, especially when there are only a few pods remaining in the hopper.

Walls 60 further include chamfers or fillets 64A and 64B that define a smooth rounded corner that prevents seed pods in hopper from causing unnecessary resistance to the servo motor. This is helpful especially when the hopper is full of pods, as the weight of the pods acting on the corners of the walls could restrict rotation of carousel. Fillets 64A and 64B each have a radius that preferably ranges from 0.15 D to 0.35 D (where D is the diameter of seed pod).

Walls 60 further define a slot depth SD that is generally equal to the diameter D of one pod. Thus, while the wall diameter WD is greater than 1 D the slot depth SD is preferably equal to 1 D. As a result, when the slots are full of pods, the entire carousel and the pods in the slot act as one solid disk, and hence this reduces resistance to rotation. If the slot depth SD is significantly more than 1 D, the pods in the hopper may provide increased resistance to the rotation of the carousel, potentially causing a jam. This depth also prevents two or more pods from being carried from a slot into the nozzle as the center of gravity of the extra pods would lie at the front edge of the slot, and hence the extra pods would always fall back into the hopper well before reaching the nozzle opening. If the slot depth SD is significantly less than 1 D the pods could fall out of the slot due to vibrations and g-forces etc.

Carousel 50 includes a central hub 66 that protrudes into hopper and preferably has a conical or convex shape. Hub 66 aids in the agitation of seed pods in hopper and guides pods toward slots under the influence of gravity.

Referring to FIG. 8, carousel 50 is secured to back wall with a screw assembly 68 that includes spacers 70 and a bearing 72 for allowing carousel 50 to be rotated. Spacer 70 located proximate to back wall is sized to form a space S between carousel and back wall to permit rotation of carousel while minimizing jams from seed pods or broken pieces of seed pods: Preferably space S is between 0.1-0.3 D (where D is the diameter of seed pod). It has been found that a space S of less than 0.1 D can become jammed with dust or smaller particles and that a space S of more than 0.3 D can become jammed with broken pieces of seed pods.

Preferably, hopper is disposed at a downward angle A relative to a horizontal plane to allow the gravity feed of seed pods into slots of carousel at a lower portion of hopper and the gravity feed of seed pods from slots of carousel into aperture of duct at an upper portion of hopper.

Mount 20 includes a mounting flange 74 that is adapted to secure seed pod deployer 10 to a distribution system 22. Mounting flange may be secured to a payload plate 76 as shown in FIGS. 9 and 10. Payload plate 76 includes adjustable rail lugs 78 that are adapted to secure payload plate to distribution system 22. Payload plate 76 further includes one or more spring based plungers 80 that are adapted to releasably engage corresponding openings 82 defined in mounting flange 74 to prevent deployer 10 from sliding during use.

Figure 11:
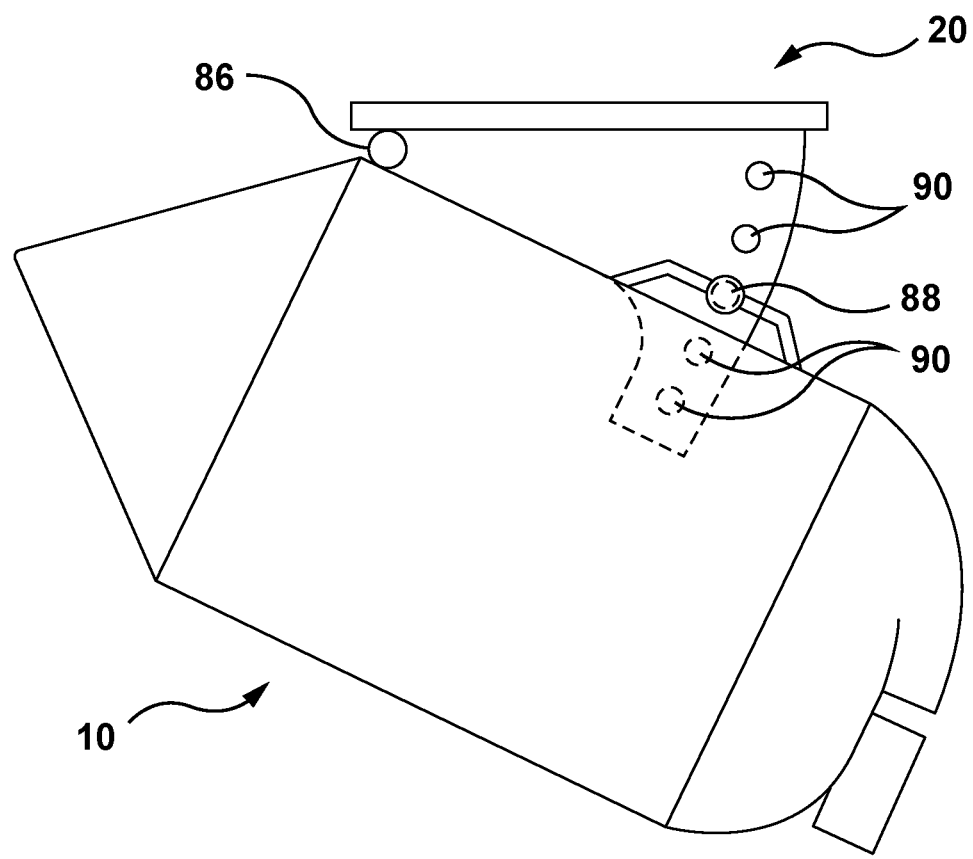
FIG. 11 is a side schematic view of an adjustment mechanism for an alternate embodiment of the brace for mounting the seed pod deployer of FIG. 1 to a distribution system.

Mounting flange 74 further includes a brace 84 disposed between mounting flange 74 and top portion of body. Brace is adapted to position hopper at downward angle A. Downward angle A is preferably in the range of 20-60 degrees and more preferably around 30 degrees. Brace 84 may be set at a fixed angle A (as shown in FIGS. 1-5) or may include an adjustment mechanism (as shown in FIG. 11) having a hinge 86, releasable pin 88 and a plurality of holes 90 for adjusting brace 84 to a desired downward angle A.

Figure 12:
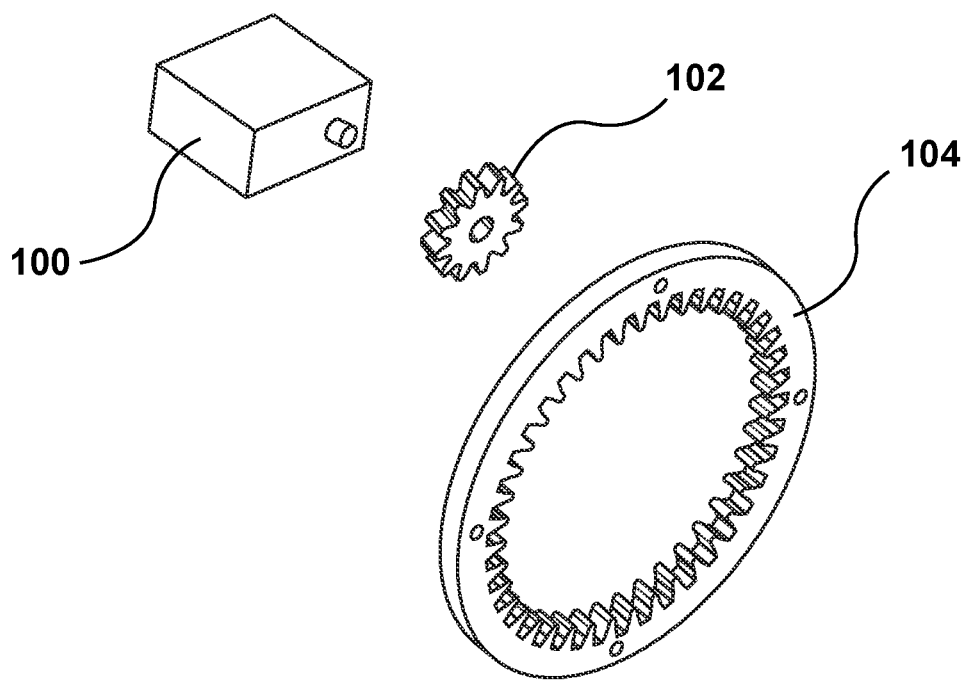
FIG. 12 is an exploded perspective view of the motor and gear system for the carousel of the seed pod deployer of FIG. 1.

Referring to FIG. 12, carousel 50 is rotated at a desired rate or at desired intervals by a motor 100 attached to a drive gear 102 that extends through back wall 32 into hopper 34 to mesh with a ring gear 104 connected to the carousel. Motor 100 is preferably a high torque brushless servo motor. A sensor 106, such as an infrared sensor, is disposed on body 12 to provide feedback to control system 18 to track the rotation of the carousel to ensure a uniform spacing between seed pods that are transferred from carousel to nozzle and subsequently launched by launcher.

A shroud 108 is disposed on body 12 to cover components of control system 18 as described below. A vent 110 is preferably defined in shroud 108 to allow air flow between the interior and exterior of the shroud. Shroud is preferably attached to the remainder of body 12 with a hinge 112 and secured with one or more releasable fasteners 114 such as bolts or other suitable fasteners.

Figure 13:
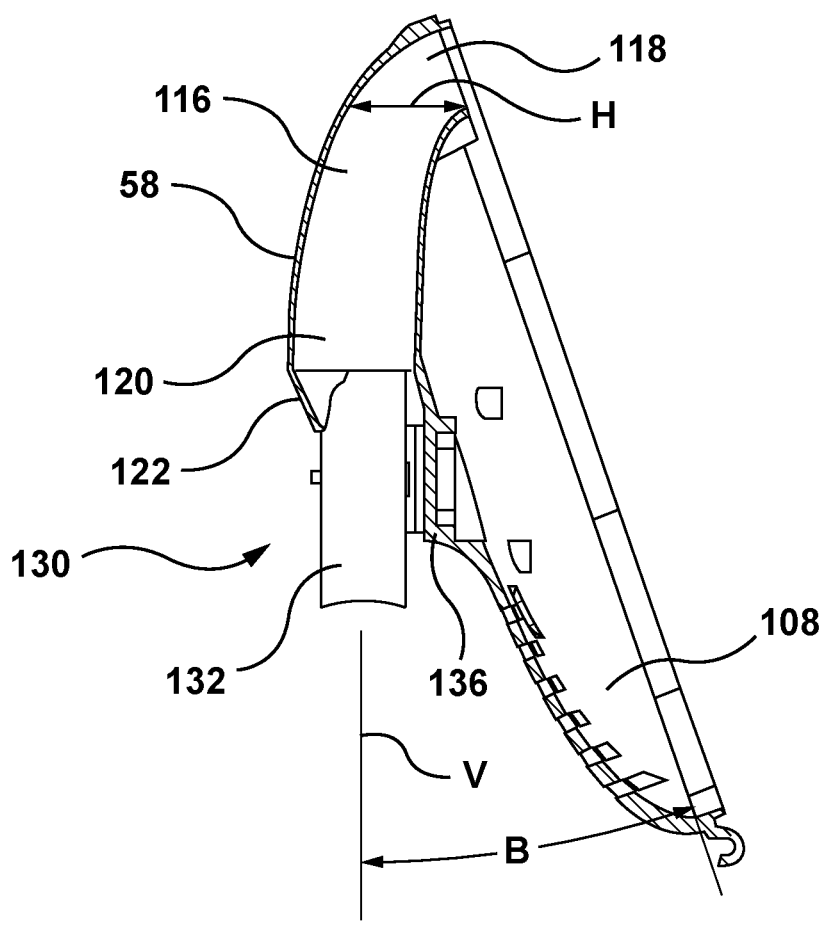
FIG. 13 is a side sectional view of the nozzle and shroud for the seed pod deployer of FIG. 1.
Figure 14:
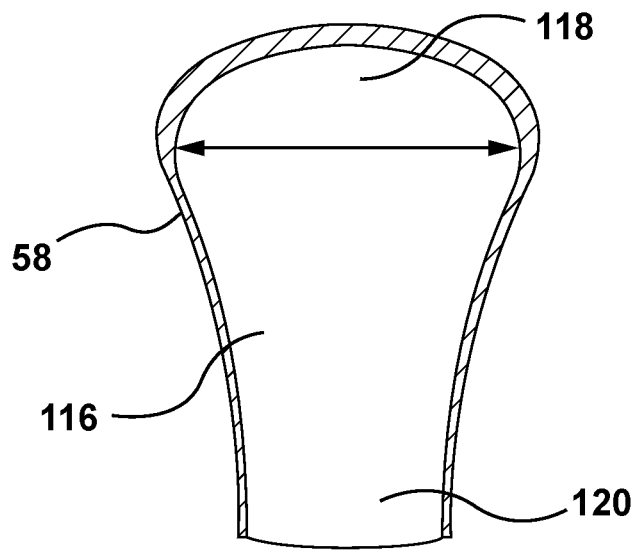
FIG. 14 is a rear view of the nozzle shown in FIG. 13.
Figure 15:
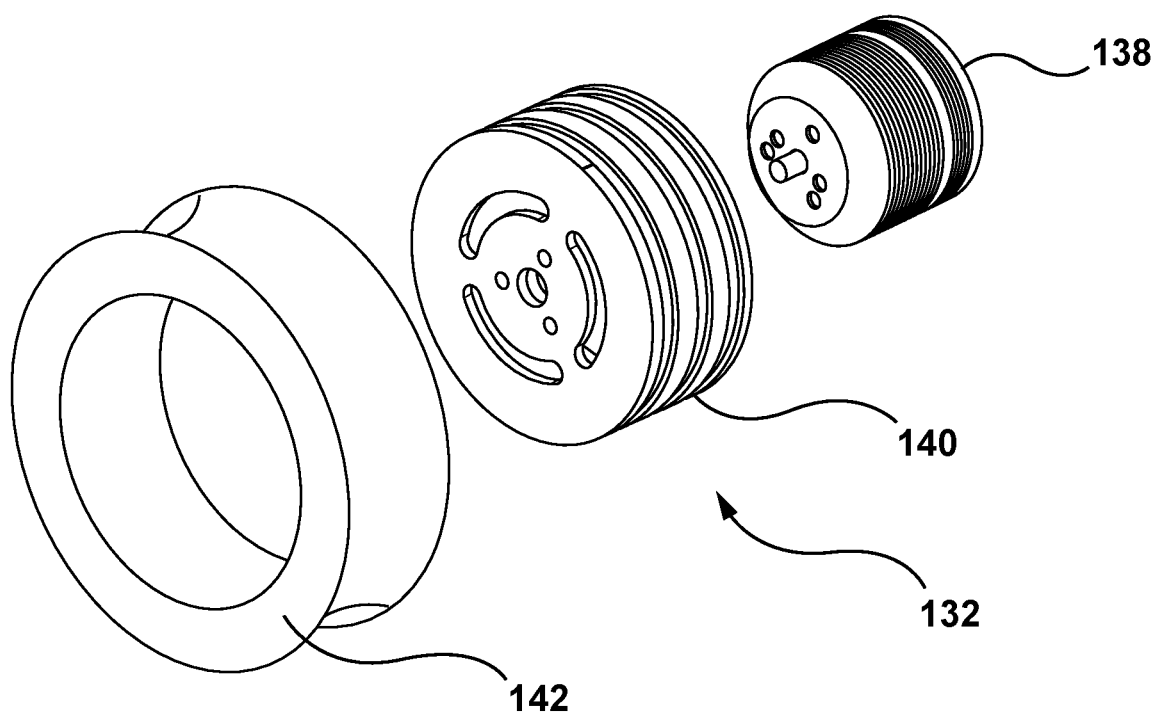
FIG. 15 is an exploded perspective view of one of the flywheels for the seed pod deployer of FIG. 1.
Figure 16:
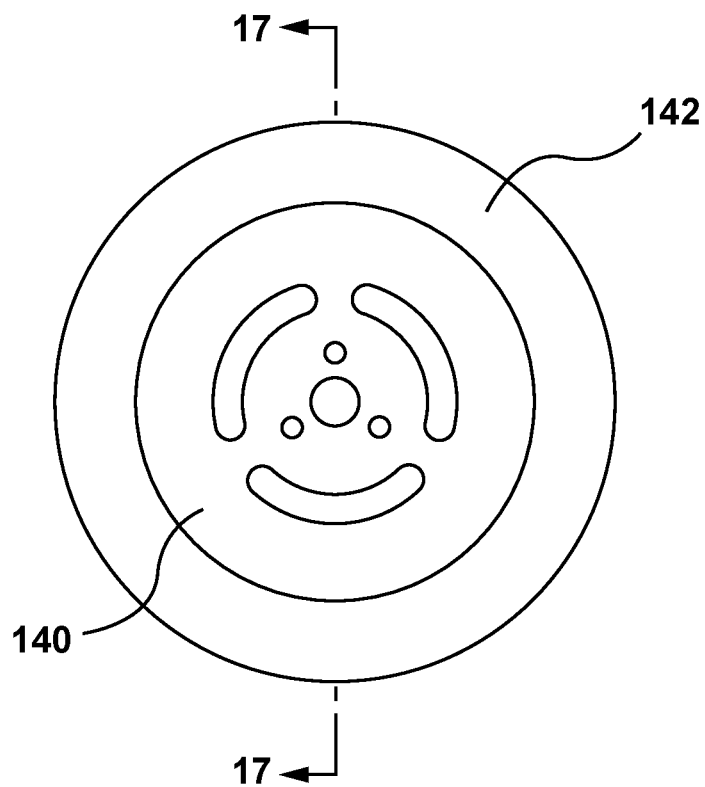
FIG. 16 is a side view of one of the flywheels for the seed pod deployer of FIG. 1.

Referring to FIGS. 13 and 14, nozzle 58 is disposed above launcher 16 preferably on the exterior of shroud 108 Nozzle 58 defines a channel 116 that leads from a nozzle opening 118, aligned with duct 54 in back wall 32, to a nozzle exit 120. Nozzle 58 further includes a tongue 122 that extends between nozzle exit 120 and launcher 16 to act as a bounce guard and ensure that seed pods 24 are directed toward the center of the flywheels.

Channel has a width W and a height H. Preferably, channel is larger in size in both width W and height H proximate to nozzle opening than it is proximate to nozzle exit.

In one embodiment, at nozzle opening 118, channel 116 has a width W of more than 3D and less than 6 D (where D represents the diameter of seed pod) and more preferably, channel 116 has a width W of more than 3D and less than 5 D. Channel 116 also has a height H of more than 1 D and less than 3D at nozzle opening 118. This allows multiple seed pods (in this instance up to three seed pods) to be loaded from slots 52 in carousel 50 through duct 54 into nozzle opening 118 while reducing the risk of seed pods 24 becoming clogged in channel 116. Preferably, at nozzle exit 120, channel 116 has a width W of more than 1 D and less than 3D and a height H of more than 1 D and less than 3D. More preferably, at nozzle exit 120, channel 116 has a width W and a height H that are each between 2D-3D and even more preferably that are each around 2.5 D.

Launcher 16 is disposed on body 12 preferably on the exterior of shroud 108. Launcher 16 includes a flywheel system 130 comprising at least one pair of flywheels 132 spaced by a desired gap 134 that is adapted to receive a seed pod as it exits nozzle 58.

Nozzle 58 and launcher 16 are preferably adapted to be oriented in a vertical plane V when seed pod deployer 10 is mounted to distribution system 22. This allows seed pod 24 to be launched along the most direct route to the ground. Since hopper 34 is preferably disposed at a downward angle A relative to mount 20, it is preferable that nozzle 58 and launcher 16 are disposed on body 12 at a corresponding angle B in order to align with the vertical plane V. Launcher 16 may include a base 136 extending from body 12 (most preferably from shroud 108) in order to support flywheel system 130 in the same vertical plane V as nozzle 58. Angle B is preferably in the range of 20-60 degrees and more preferably around 30 degrees.

Referring to FIGS. 15-18, flywheels 132 are driven by flywheel motors 138 at a desired speed. Flywheel motors 138 are preferably high RPM and low torque motors to provide optimum tangential velocity. Higher torque motors may be utilized however to accommodate a higher number of seed pods launched per second.

Launcher 16 is adapted to launch seed pods 24 at an exit velocity which surpasses terminal velocity, typically at least 40 m/s for seed pod 24. This has been found to be sufficient to embed seed pods in a typical ground surface at altitudes of 50 meters above the ground (which is typically above most tree lines). Furthermore, launcher 16 is adapted to launch seed pods 24 at a rate of at least five seed pods per second without jamming in nozzle 58.

When deployer 10 is utilized in conjunction with mapping software (which accounts for changes in ground topography), precision planting is enabled and can ensure seed pods 24 are not wasted through erroneous planting on roads, water, rocks and are instead planted only in target areas.

Flywheels 132 each comprise a hub 140 and a wheel 142. Hub 140 is preferably formed from a lightweight durable material such as aluminum and wheel 142 is preferably formed from a soft durable material such as polyurethane that is adapted to grip seed pod 24 sufficiently to guide seed pod 24 through gap 134. The thickness of wheel 142 determines how much wheel 142 may compress when contacting a seed pod 24. High compression results in better energy transfer to seed pod 24 however a greater thickness also increases centrifugal force on wheel 142 which may impact performance.

Figure 17:
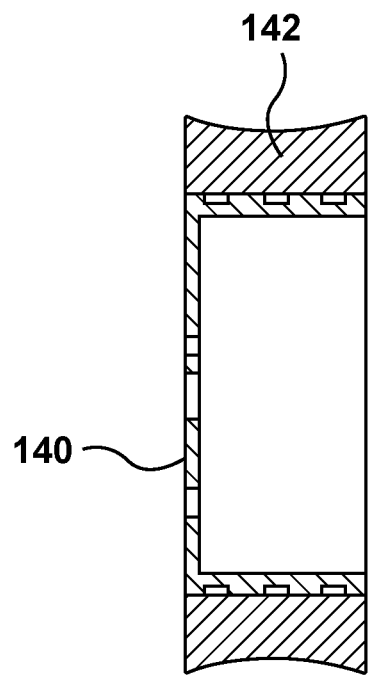
FIG. 17 is a sectional view of the flywheel shown in FIG. 16 as viewed along lines 17-17.
Figure 18:
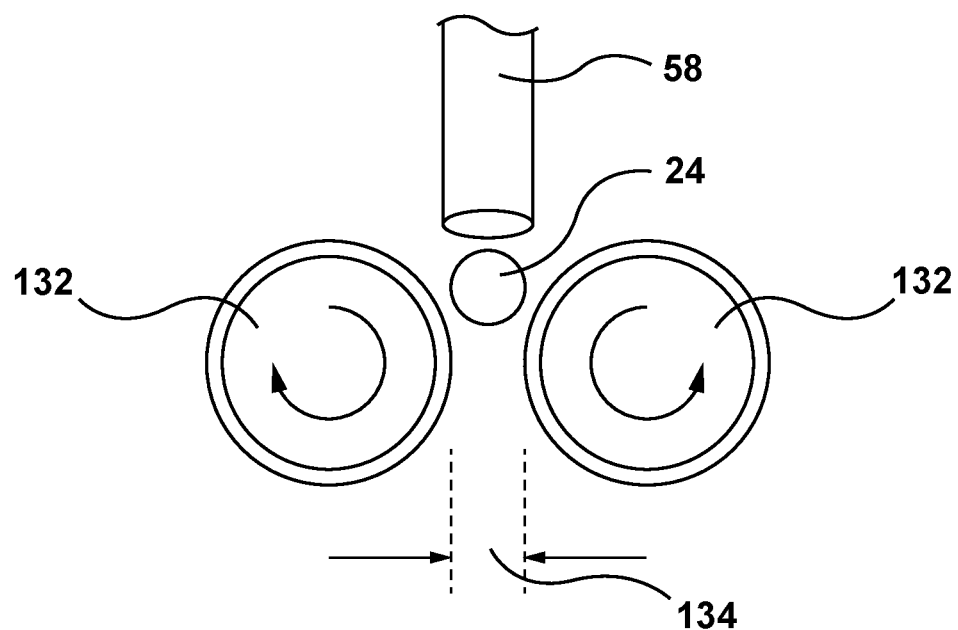
FIG. 18 is a schematic view of the fly wheels and a seed pod for the seed pod deployer of FIG. 1.

Wheel 142 may have a concave profile as shown in FIG. 17 that matches the profile of seed pod 24 to enhance the grip and direction of launch of seed pod 24.

The size of gap 134, or distance between flywheels 132, affects the amount of compression applied to seed pod 24 as it passes through gap 134. A smaller gap 134 results in higher compression and greater exit velocity however too much compression may damage seed pod 24.

The size of the gap 134 preferably ranges from 0.75 D to 0.95 D (where D is the diameter of a seed pod). If a concave wheel 140 is used, the size of gap 134 stays the same (measured from the base of each wheel 140). The choice of size of gap 134 is also influenced by the Shore Hardness of wheel 140, brushless motor RPM, site soil condition and other factors.

Flywheel motors 138 are mounted to mounting slots 144 located on shroud 108. Mounting slots 144 preferably each have a cross shape that allows for adjustments to be made on the size of gap 134 as well as proximity of flywheels 132 to nozzle exit 120.

Figure 19:
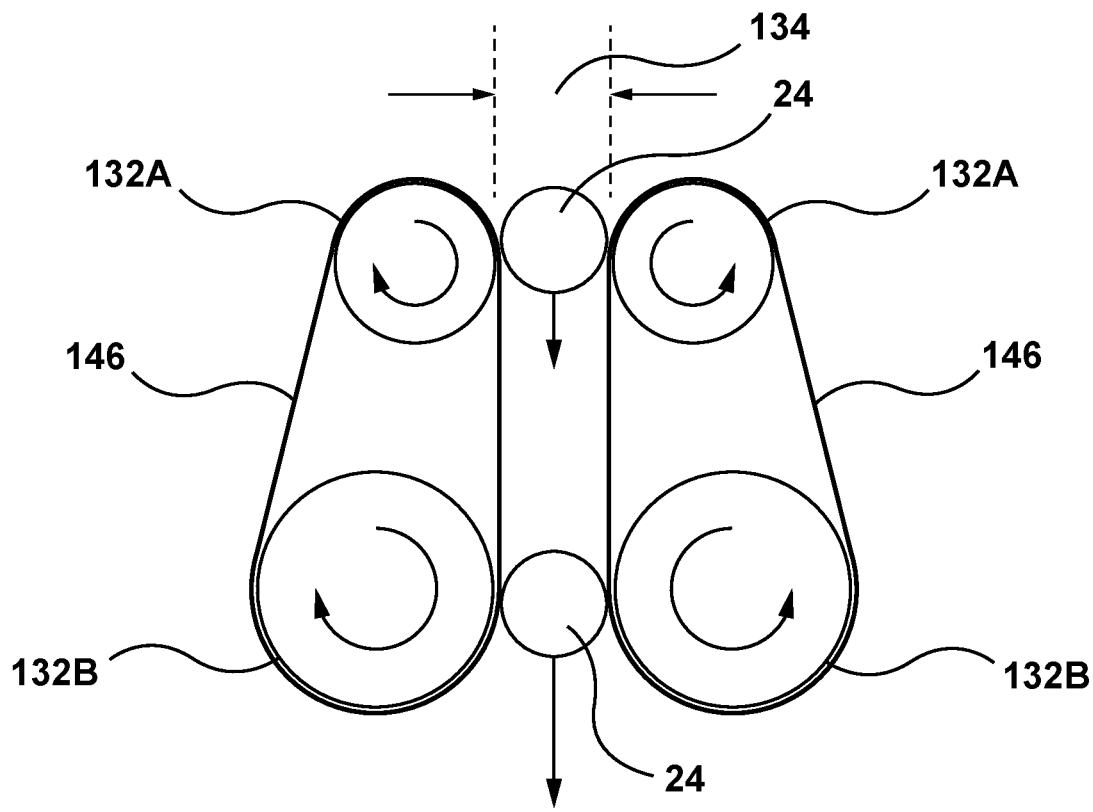
FIG. 19 is a schematic view of an alternative embodiment for the fly wheels and a seed pod for the seed pod deployer of FIG. 1.

Referring to FIG. 19, an alternative embodiment of flywheel system 130 is shown. In this embodiment, flywheel system 130 may include first and second pairs of flywheels 132A and 132B and a corresponding pair of opposing continuous belts 146 extending between the first and second pairs of flywheels 132A and 132B. Belts 146 preferably each have a width of approximately 2D (where D is the diameter of seed pod 24). First and second pairs of flywheels 132A and 132B are preferably spaced between 0.75 D-2.0 D apart (where D is the diameter of a seed pod). The second pair of flywheels 132B may have a larger diameter (preferably by 1.25-1.50 times) than the first pair of flywheels 132A. The gap 134 between each pair of flywheels may remain the same however. Preferably, the second pair of flywheels 132B are driven by motors 138 which cause belts 146 and first pair of flywheels 132A to move as well. Motors 138 may be mounted to cross shaped mounting slots 144 as described above to allow for adjustments to be made in the size of gap 134 etc. A seed pod 24 is deposited by nozzle 58 into the gap 134 between the first pair of flywheels 132A and then is carried by the opposing continuous belts 146 to gap 134 between the second pair of flywheels 132B. This allows the seed pods 24 to be launched at a higher velocity.

Seed pods 24 are adapted to contain a seed (or multiple seeds) and are formed from a composition of ingredients that are adapted to aid in the protection, germination and growth of seed. Seed pod 24 may further include a shell on its exterior surface to enhance the hardness of seed pod 24. Preferably, seed pod 24 has a generally spherical shape.

Seed is intended to mean a seed, seedling or other propagule that functions to propagate a new organism. The current preferred embodiment of seed is a seed adapted for growing a desired species of tree for reforestation projects. Other embodiments may include seeds, seedlings or other propagules for growing grasses, plants or other desired organisms.

During use, seed pods 24 are loaded into hopper 134 of seed pod deployer 10 mounted to distribution system 22. Control system 18 is activated and seed pods 24 are transferred by feeder 14 from hopper 134 to launcher 16 in order to be deployed at desired locations. Preferably, seed pods 24 are propelled by seed pod deployer 10 sufficiently to be partially or fully embedded within a ground surface. Seed pods 24 are adapted to then support and promote growth of seeds within the ground surface.

Figure 20:
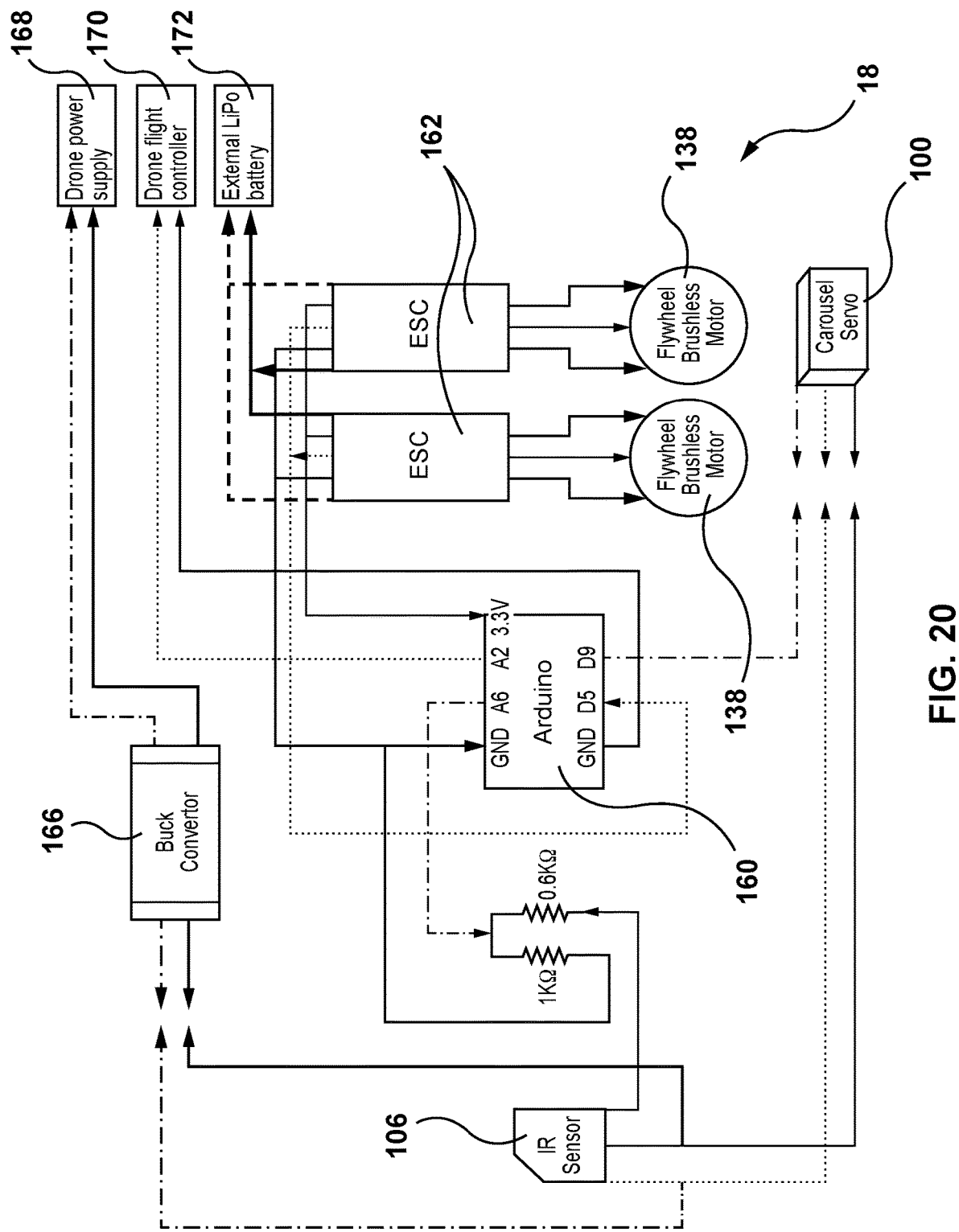
FIG. 20 is a schematic view of the control system for the seed pod deployer of FIG. 1.

Referring to FIG. 20, a schematic view of control system 18 is shown. Control system 18 includes a microcontroller 160, a pair of electronic speed controllers (ESCs) 162, sensor 106, carousel servo motor 100 and a buck controller 166. Control system 18 is adapted to operate as a closed loop system that utilizes the power supply 168 and camera shutter signal transmitter 170 of distribution system 22. The carousel motor 100 operates independently through feedback from the IR sensor. The rate of rotation is changed to consistently deliver a set number of pods through the outlet irrespective of the pod load. Carousel motor 100 is powered by power supply 168 of distribution system 22 while flywheel motors 138 are powered by a separate power supply 172 (such as a LiPo battery) located on deployer 10. In a further preferred embodiment, all systems including control system 18, carousel motor 100 and flywheel motors 138 receive power from power supply 168 of distribution system 22.

Figure 21:
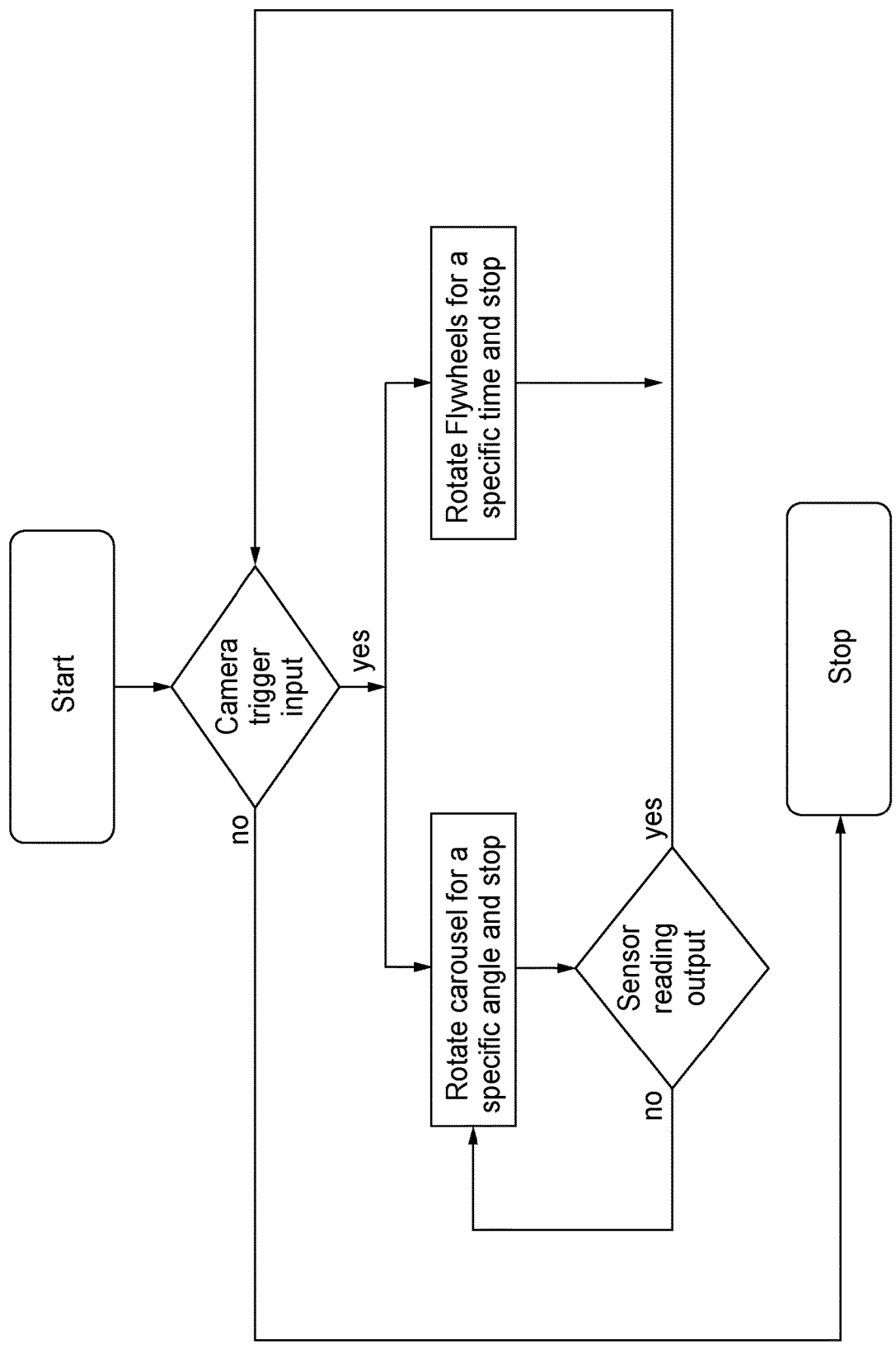
FIG. 21 is a flow chart showing the operation of the control system for the seed pod deployer of FIG. 1.

During use, as shown in FIG. 21, microcontroller 160 receives a signal (typically a camera shutter signal) from transmitter 170 of distribution system 22. Microcontroller 160 outputs a pulse width modulation (PWM) signal to servo motor 100 to control rotation of carousel 50. The length of PWM signal is tuned to control the rate of rotation of carousel 50 based on input from sensor 106. At the same time, microcontroller 160 communicates with ESCs 162 to control operation of flywheel motors 138 for launching seed pods 24 at a desired exit velocity.

In one embodiment, the system rotates a designated number of slots 52 (such as five slots with pods) and stops for the next camera trigger signal. In another embodiment, carousel 50 may rotate continuously while the speed of the motor 100 is controlled with a PID feedback encoder (thus no longer requiring IR sensor input).

Operation of deployer 10 may be controlled manually or may be automated with software defining pre-designated travel paths and pre-designated planting density according to known parameters.

While the above description provides examples of one or more processes or apparatuses, it will be appreciated that other processes or apparatuses may be within the scope of the accompanying claims.

What is claimed is:

1. A seed pod deployer for use with an aerial drone distribution system, the seed pod deployer comprising:
a hopper adapted to contain a plurality of seed pods;
a feeder adapted to transfer the seed pods from said hopper to a nozzle, said feeder including a motor that is adapted to receive a signal to control the transfer of the seed pods from said hopper to said nozzle;
a launcher adapted to receive the seed pods from said nozzle and launch the seed pods toward a ground surface, said launcher comprising a pair of flywheels and at least one motor adapted for driving said pair of flywheels, wherein said pair of flywheels is spaced by a gap adapted to receive and launch a seed pod; and
a control system that operates in a closed loop for controlling the operation of the seed pod deployer during flight of the aerial drone distribution system, said control system including a sensor for providing feedback to said control system, said control system further including a microcontroller that is adapted to control said feeder by sending a signal to said motor of said feeder to transfer the seed pods from said hopper to said nozzle based on information received from said sensor.

2. The seed pod deployer of claim 1, wherein said microcontroller is further adapted to communicate with said at least one motor of said launcher to launch the seed pods at a desired velocity.

3. The seed pod deployer of claim 1, wherein said nozzle defines a channel that extends from a nozzle opening, proximate to said feeder, to a nozzle exit, proximate to said launcher.

4. The seed pod deployer of claim 3, wherein said nozzle includes a tongue that extends between said nozzle exit and said gap between said pair of flywheels.

5. The seed pod deployer of claim 1, wherein said feeder comprises a carousel having a plurality of slots each of which are sized to receive one of the seed pods.

6. The seed pod deployer of claim 5, wherein said carousel is rotated by said motor of said feeder at a desired rate.

7. The seed pod deployer of claim 5, wherein each of said plurality of slots is defined by a wall having a diameter in the range of 1.2 to 2.0 D with an opening having a width in the range of 0.8 to 1.4 D (where D is the diameter of one of said plurality of seed pods).

8. The seed pod deployer of claim 5, wherein each of said plurality of slots is defined by a wall that is generally cylindrical in shape.

9. The seed pod deployer of claim 5, wherein said carousel has a central hub with a conical or convex shape.

10. The seed pod deployer of claim 5, wherein said hopper is disposed at a downward angle relative to a horizontal plane to allow a gravity feed of said plurality of seed pods into said slots of said carousel.

11. The seed pod deployer of claim 1, further comprising a mount disposed on said body for mounting said seed pod deployer to said aerial drone distribution system wherein said mount is adapted to support said hopper at a downward angle relative to a horizontal plane to allow a gravity feed of the seed pods toward said feeder.

12. The seed pod deployer of claim 11, wherein said mount further includes an adjustment mechanism for adjusting said downward angle.

13. The seed pod deployer of claim 1, wherein said sensor is adapted to provide feedback regarding said feeder.

14. The seed pod deployer of claim 1, wherein said sensor is an infrared sensor.

15. The seed pod deployer of claim 1, wherein said microcontroller outputs a pulse width modulation (PWM) signal to said feeder based on input from said sensor.

16. The seed pod deployer of claim 1, wherein said microcontroller controls said feeder in response to a signal received from the aerial drone distribution system.

17. The seed pod deployer of claim 1, wherein said sensor is a PID feedback encoder.

18. A distribution system for seed pods comprising:
an aerial drone;
a seed pod deployer having:
  a hopper adapted to contain a plurality of seed pods;
  a feeder adapted to transfer the seed pods from said hopper to a nozzle, said feeder including a motor that is adapted to receive a signal to control the transfer of the seed pods from said hopper to said nozzle;
  a launcher adapted to receive the seed pods from said nozzle and launch the seed pods toward a ground surface, said launcher comprising a pair of flywheels and at least one motor adapted for driving said pair of flywheels, wherein said pair of flywheels is spaced by a gap adapted to receive and launch a seed pod;
  a control system that operates in a closed loop for controlling the operation of said seed pod deployer during flight of said aerial drone, said control system including a sensor for providing feedback to said control system, said control system further including a microcontroller that is adapted to control said feeder by sending a signal to said motor of said feeder to transfer the seed pods from said hopper to said nozzle based on information received from said sensor; and
a mount disposed on said seed pod deployer for mounting said seed pod deployer to the aerial drone.

19. The distribution system of claim 18, wherein said control system and said feeder are adapted to receive power from the aerial drone.

20. The distribution system of claim 18, wherein said microcontroller is further adapted to communicate with said at least one motor of said launcher to launch the seed pods at a desired velocity.

* * * * *